No. 749,211. PATENTED JAN. 12, 1904.
G. L. MERRELL.
SOLDERING MACHINE.
APPLICATION FILED MAR. 14, 1895.
NO MODEL. 5 SHEETS—SHEET 1.

WITNESSES:
INVENTOR
Gaius Lewis Merrell
BY
Kay Parsons
ATTORNEYS

No. 749,211. PATENTED JAN. 12, 1904.
G. L. MERRELL.
SOLDERING MACHINE.
APPLICATION FILED MAR. 14, 1895.
NO MODEL. 5 SHEETS—SHEET 3.

WITNESSES:
H. E. Chase
Conre Schornick

INVENTOR
Gaius Lewis Merrell
BY
Hey & Parsons
ATTORNEYS

No. 749,211. Patented January 12, 1904.

UNITED STATES PATENT OFFICE.

GAIUS LEWIS MERRELL, OF SYRACUSE, NEW YORK, ASSIGNOR TO MERRELL-SOULE COMPANY, OF SYRACUSE, NEW YORK, A CORPORATION OF NEW YORK.

SOLDERING-MACHINE.

SPECIFICATION forming part of Letters Patent No. 749,211, dated January 12, 1904.

Application filed March 14, 1895. Serial No. 541,706. (No model.)

*To all whom it may concern:*

Be it known that I, GAIUS LEWIS MERRELL, of Syracuse, in the county of Onondaga, in the State of New York, have invented new and useful Improvements in Soldering-Machines, of which the following, taken in connection with the accompanying drawings, is a full, clear, and exact description.

This invention relates to improvements in soldering-machines, particularly applicable for use with machines for soldering cans, and has for its object the production of a device which feeds the solder practically and effectively, prevents its undue waste, and permits the cans to be soldered with great rapidity; and to this end it consists in the combination, construction, and arrangement of the parts of a soldering-machine, as hereinafter fully described, and pointed out in the claims.

In describing this invention reference is had to the accompanying drawings, forming part of this specification, in which like letters indicate corresponding parts in all the views.

In order to produce the best result, a soldering-tool should move at comparatively slow speed, and consequently it is capable of but a limited number of operations in a given time. The solder for such a tool should also be fed uniformly and only when an article to be soldered is present, and this result can be best effected only when the solder is fed slowly. Considerable difficulty has therefore been experienced in adapting soldering-machines for simultaneous use with the best constructions of filling-machines, which supply filled cans with great rapidity. This object has been effected in this improved machine by so supporting and connecting a series of soldering-tools that several operate simultaneously and each at comparatively slow speed, and by so arranging the solder-feeding mechanism that the solder is movable at comparatively slow speed and is supplied independently to each soldering-tool only when an article to be soldered is present. Consequently, although the individual speed of the soldering-tools is comparatively slow, the machine delivers the soldered articles with great rapidity.

Figure 2:
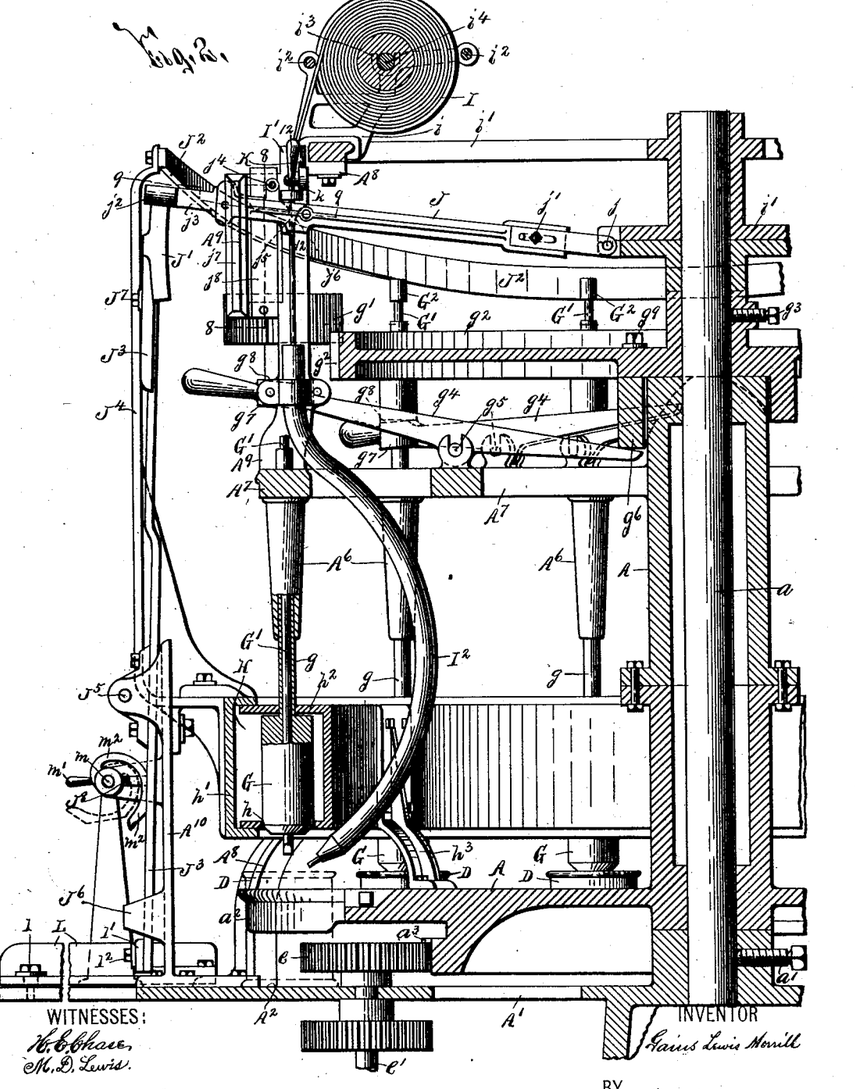
Fig. 2 is an enlarged vertical sectional view taken on line 2 2, Fig. 1, the driving mechanism for operating the feed and the other movable parts being omitted.
Figure 3:
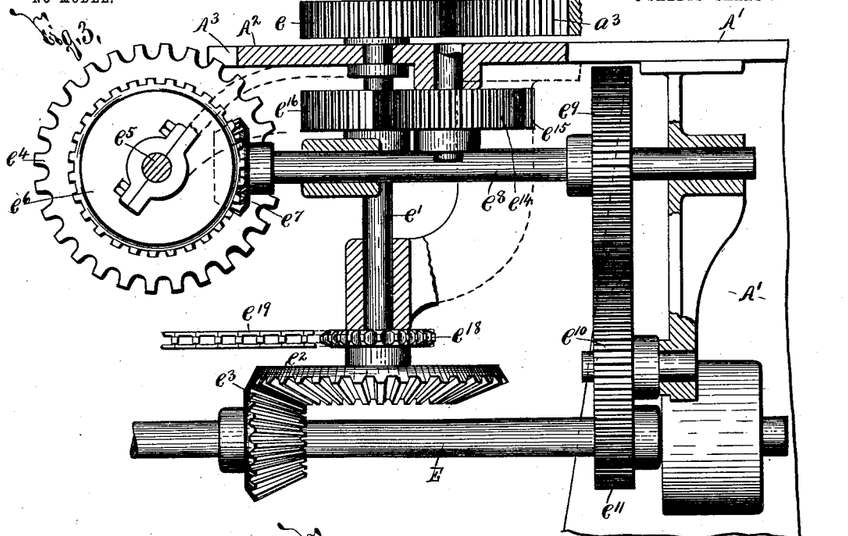
Figs. 3 and 4 are respectively side elevation and top plan view of said detached driving mechanism.
Figure 4:
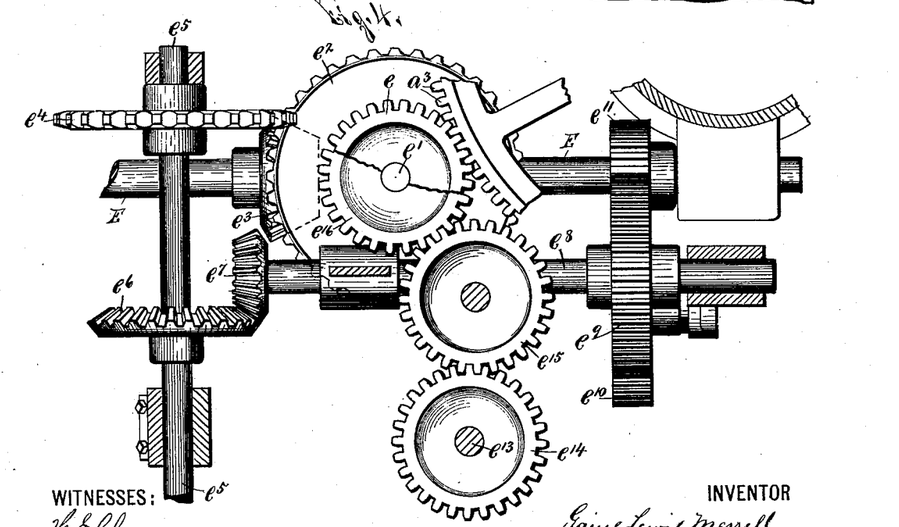
Figure 5:
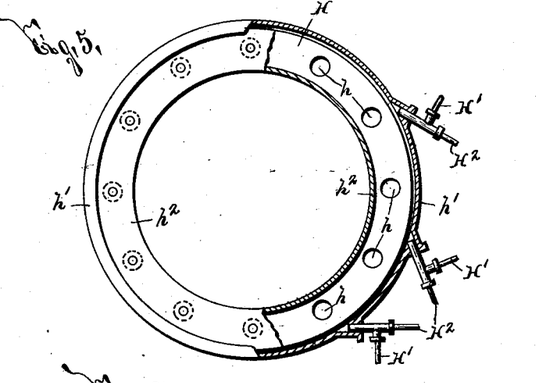
Fig. 5 is a top plan, partly in section, of the detached heating-chamber for the soldering-tools.

The main feed A for the cans or other articles to be soldered and the supplemental feeds B C for conveying said articles toward and away from the feed A may all be of any desirable form, size, and construction and may be actuated by any suitable mechanism. The feed A is preferably revoluble, and, as clearly seen at Fig. 2, it is journaled on a stationary rod or bar $a$, having its lower end secured by a screw or other fastening means $a'$ to the frame A' of the soldering-machine. Projecting arms $a^2$ or other suitable devices are provided one in advance of the other upon the feed A for engaging the cans or other articles D conveyed by the feed B, and, as clearly seen at Fig. 2, the lower ends of the cans engaged by the arms $a^2$ rest upon a bearing-face $A^2$ of the frame A'. The feed A is preferably revolved by a driving-pinion $e$, engaged with a series of gear-teeth $a^3$, provided upon said feed. This pinion $e$ may be driven by any suitable means, but is here shown as mounted upon a shaft $e'$, connected by bevel-gears $e^2 e^3$ to the main driving-shaft E, which is driven by suitable actuating means, as tight and loose pulleys, not necessary to herein illustrate or describe.

The supplemental feed B is here shown as consisting of a chain movable in a slot $A^3$ in the frame $A'$, which is provided with separated ribs $A^4$, arranged on opposite sides of the groove $A^3$ in order to form a guide for the feeding cans or other articles to be soldered. The chain B is provided with a series of teeth $b$ or other suitable devices, arranged one in advance of the other for engaging the cans, and is driven by a sprocket-wheel $e^4$, suitably connected to the driving-shaft E. The sprocket-wheel $e^4$ is here shown as mounted on a shaft $e^5$, connected by bevel-pinions $e^6 e^7$ to an intermediary shaft $e^8$, connected by gears $e^9 e^{10} e^{11}$ to the driving-shaft E.

The supplemental feed C for conveying the cans or other soldered articles from the main feed A is here illustrated as consisting of an endless belt movable between guide-walls $A^5$ and actuated by a pulley $e^{12}$, mounted upon the shaft $e^5$, previously mentioned.

The cans or other articles soldered by this machine are withdrawn from the feed A and arranged in operative position upon the supplemental feed C by suitable discharging means, here illustrated as oppositely-arranged arms $C'$, mounted upon a shaft $e^{13}$, connected by gears $e^{14} e^{15} e^{16}$ to the shaft $e'$, previously described.

The main feed A, the supplemental feeds B C, and the driving mechanism for said feeds, just described, are particularly applicable for use with this invention; but it is obvious that any other suitable feeding mechanism may be used, if desired, and that the detail construction and arrangement of the foregoing parts form no essential feature of this invention.

Figure 1:
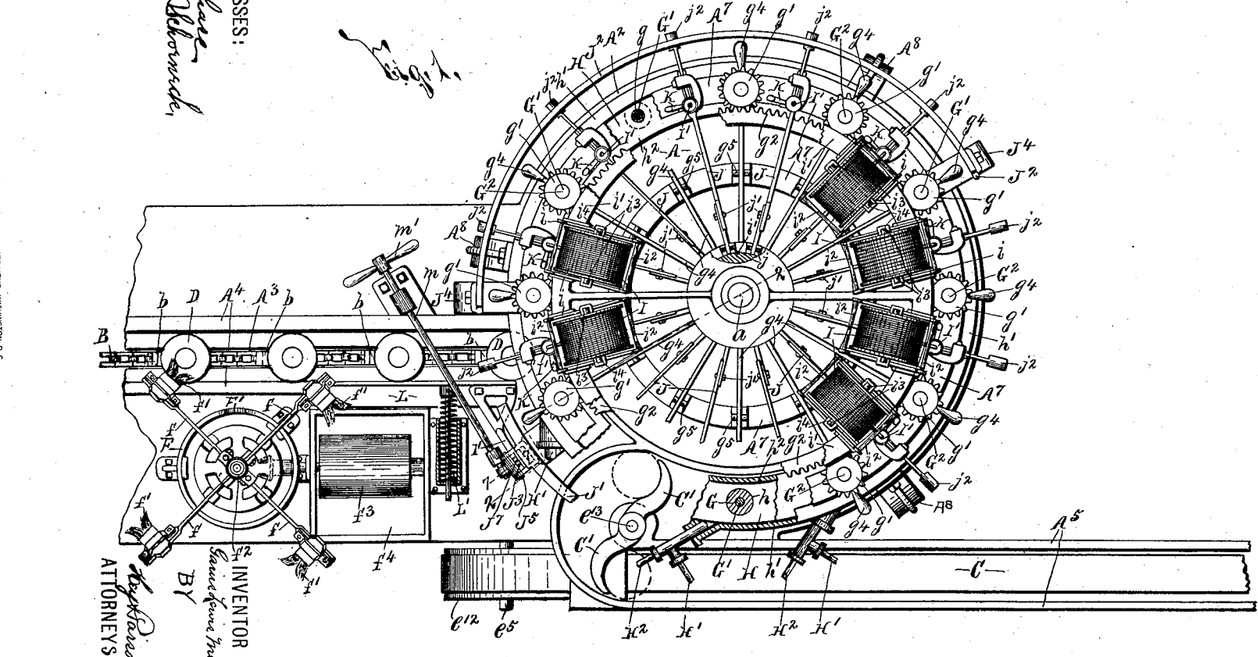
Figure 1 is a top plan view of this improved soldering-machine, portions thereof being broken away and shown in section for more clearly illustrating the underlying parts.

The unsoldered cans or other articles upon the feed B are preferably provided with flux before they are fed to the main feeding device A, and, as here illustrated, the feed for supplying the flux to said articles is provided with a plurality of feeding members or arms $f$, having their outer ends movable above the feed B and usually in a direction opposite to that of the articles to be soldered. The inner ends of the feeding members or arms $f$ are preferably pivotally connected to a rotary carrier or head provided upon a revoluble shaft $f^2$ in a plane above the feed B, and the outer ends of said feeding members or arms are provided with brushes $f'$ and are movable upon a substantially horizontal track or support F, which generally consists of a guide-ring having its side adjacent to the feed B formed with a depression $F'$, Fig. 1, arranged above said feed and provided with downwardly curved or inclined sides. The brushes $f'$ are usually arranged in an annular row, and their lower or engaging faces are normally elevated above the plane of the tops of the cans or other articles D until said brushes are directly above the cans or other articles, whereupon the feeding members or arms $f$ engage the advance side of the depression $F'$ and drop downwardly by gravity. The brushes $f'$ then wipe across the cans or other articles until the feeding members or arms engage the opposite side of the depression $F'$, which successively raises said feeding members or arms until the lower or engaging faces of the brushes $f'$ are elevated into their normal position above the plane of the tops of the cans or other articles D.

Figures 6, 7, 8:
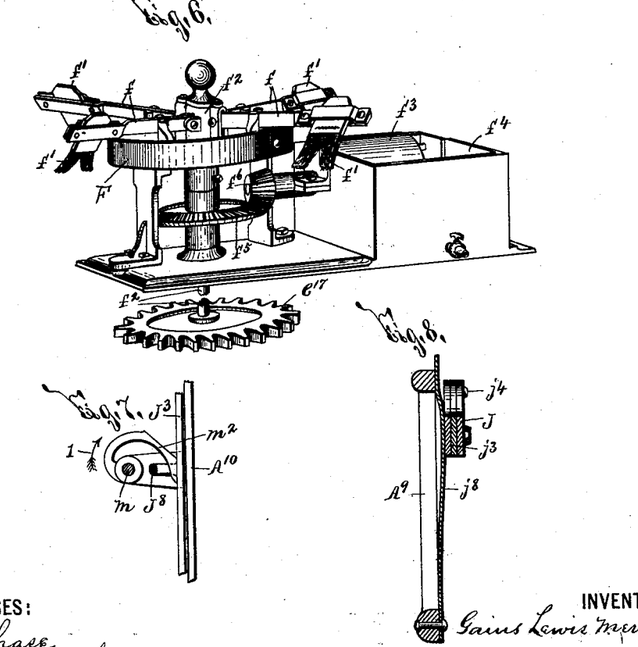
Fig. 6 is a perspective of the detached flux-feeding device.
Fig. 7 is a detail vertical sectional view taken on line 7 7, Fig. 1.
Fig. 8 is a detail vertical sectional view taken on line 8 8, Fig. 2.
Figures 9, 10, 11, 12:
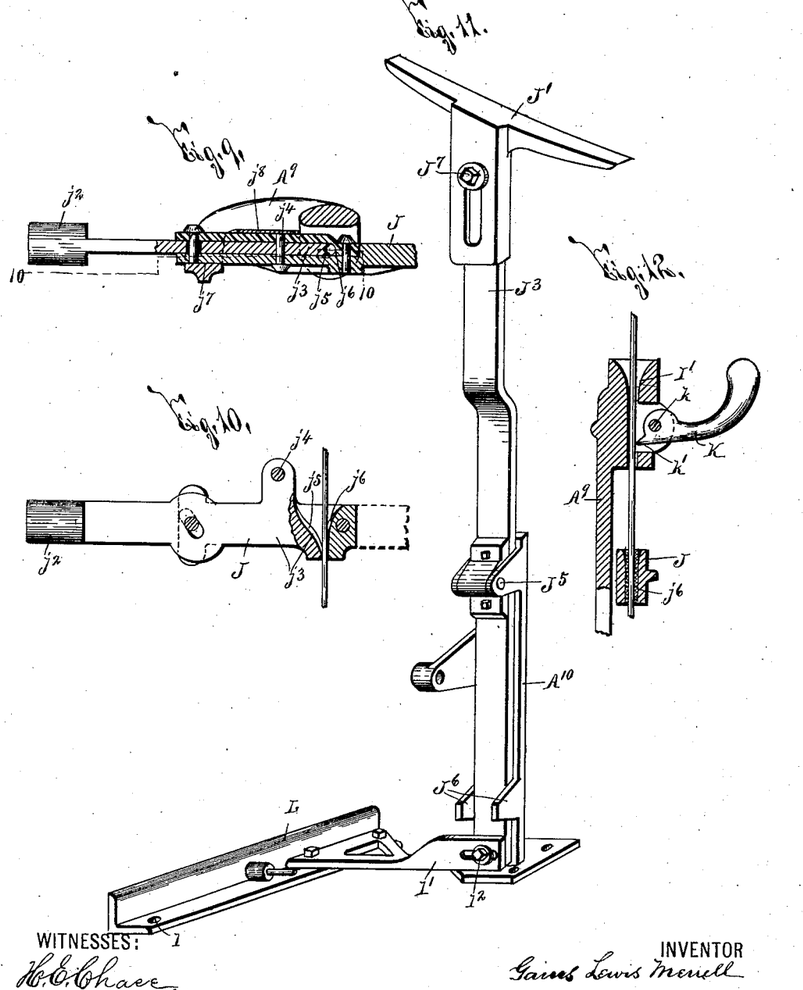
Fig. 9 is a horizontal detail sectional view taken on line 9 9, Fig. 2.
Fig. 10 is a detail vertical sectional view taken on line 10 10, Fig. 9, illustrating particularly the member for engaging the solder.
Fig. 11 is an isometric view of the detached cam for forcing the solder-feed to operative position, the operating member for controlling the movement of said cam, and the connections between said cam and operating member.
Fig. 12 is a detail sectional view taken on line 12 12, Fig. 2, illustrating particularly the stop for preventing return movement of the solder.

The feeding members or arms $f$ when constructed and operating as described do not engage the adjacent edges of the cans or other articles D as said members assume their operative position, and consequently there is no liability of the accumulation of flux upon said edges of the cans or other articles D. The brushes $f'$ are of any desirable form, size, and construction, and their central portions are usually cut away, as clearly seen in Figs. 1 and 6, for preventing undue feeding of the flux upon the tops of the cans or other articles D. The flux is preferably supplied to the feeding members or arms $f$ by a second feeding member, which usually consists of a roll $f^3$, having a portion of its periphery arranged in the path of the brushes $f'$ and an opposite portion of said periphery immersed in a body of liquid flux within a suitable receptacle $f^4$. The roll $f^3$ is generally positively driven by bevel-gears $f^5 f^6$, connecting a spindle provided upon the roll $f^3$ to the shaft $f^2$, which is positively driven by sprocket-wheels $e^{17} e^{18}$, mounted on the shafts $f^2$ $e'$ and connected by a chain $e^{19}$. This flux-feeding device is particularly applicable for use with this invention; but it is obvious that any other flux-feeding device may be used.

The soldering-tools G used in connection with this machine may also be of any desirable form, size, and construction and are preferably arranged within a heating-chamber H, provided with apertures $h$ in its lower wall through which the soldering-tools are movable as their extremities are depressed into engagement with the cans D, arranged directly beneath the soldering-tools. The soldering-tools G are preferably provided with spindles $g$, reciprocally movable in substantially vertical planes in bearings $A^6$, provided upon a frame or annular flange $A^7$, secured to the hub of the feed A, and consequently the soldering-tools are revoluble simultaneously with the feed A. Said soldering-tools are also usually axially revoluble, and their spindles $g$ are provided with pinions $g'$, which mesh with a stationary gear or rack $g^2$, secured to the rod or bar $a$ by a screw or other fastening means $g^3$.

Suitable mechanism, as levers $g^4$, pivoted at $g^5$ to the frame or annular flange $A^7$, is utilized for raising and lowering the soldering-tools G. The levers $g^4$ are preferably operated by a stationary cam $g^6$, secured to the gear or rack $g^2$. The outer ends of the levers $g^4$ are provided with hubs $g^7$, through which the spindles $g$ are passed, and the upper faces of said hubs engage shoulders $g^8$, provided upon said spindles. Consequently as the cam $g^6$ depresses the inner ends of the levers $g^4$ the outer ends of said levers are raised and operate to elevate the soldering-tools, and as the cam $g^6$ permits the inner ends of the levers $g^4$ to move upwardly the weight of the soldering-tools forces the same into contact with the tops of the cans.

Soldering-tools arranged and connected as just described are particularly applicable for use with this invention, as each soldering-tool moves comparatively slowly and several operate simultaneously.

To facilitate the operation of the soldering-tools and hold the caps in position, each soldering-tool and its spindle $g$ is formed hollow, and rods G' are movable longitudinally therethrough and are arranged with their lower ends beneath the lower faces of the soldering-tools. The upper ends of the rods G' are provided with shoulders $G^2$, which engage the top faces of the spindles $g$.

The heating-chamber H, previously mentioned, preferably consists of a stationary section $h'$, secured to brackets $A^8$, projecting from the frame A, and a revoluble section $h^2$, secured by brackets $h^3$ to the main feed A. This chamber H is heated to the desired extent by suitable fuel and air-conducting pipes H' $H^2$, discharging through the stationary section $h'$ into said chamber, and as the revoluble soldering-irons approach and recede from the pipes H' $H^2$ they are all uniformly heated.

This invention is not limited to any particular construction of soldering-tools or means for operating and heating the same, since it is obvious that any suitable construction of said parts may be used, if desired.

The solder for the soldering-tools preferably consists of reels I of wire-solder and is fed to the tools G by suitable solder-feeds, that may be operated by any desirable construction of actuating means. The reels I are suitably supported by arms $i$, mounted upon a revoluble frame $i'$, connected by brackets $A^9$ to the frame or annular flange $A^7$. The brackets $i$ are provided with guide-rollers $i^2$ and are formed with open bearings $i^3$ for permitting ready securement and removal of the spindles $i^4$ of the wire-reels I. The feeding end of the wire-solder is passed downwardly through an upper guide I', preferably supported by one of the brackets $A^9$, and is engaged by the corresponding solder-feed and a stop K for preventing return movement of the solder. The wire-solder is then conducted through a bent guide $I^2$, having its lower end arranged in proximity to the lower face of the heating-chamber H, and as the wire-solder emerges from the lower end of the guide $I^2$ it engages the corresponding soldering-tool G.

The solder-feeds preferably consist of independently-movable feeding-levers J and engaging members $j^3$, presently described. The inner ends of the feeding-levers J are pivoted at $j$ to the revoluble frame $i'$ and consist of inner and outer sections adjustably secured together by clamps $j'$. The outer ends of the engaging members $j^3$ are provided with bearing-surfaces $j^2$ for engaging suitable actuating means, as cams J' $J^2$, for forcing the levers J upwardly to their operative position and depressing said levers slowly to feed the wire-solder to the tools G. These cams J' $J^2$ are preferably so arranged that the solder is fed to the tools G when the same are depressed into operative position and are axially rotating. The cam J' is mounted upon a movable support $J^3$, presently described, for forcing said cam into and out of operative position, and the cam $J^2$ is secured to stationary standards or supports $J^4$ and is of sufficient length to force the feeding-levers downwardly at comparatively slow speed. The engaging members $j^3$ are preferably mounted on the outer ends of the feeding-levers J and are pivoted thereto at $j^4$, and their inner ends are provided with engaging faces $j^5$, arranged beneath said pivots $j^4$ and nearer the wire-solder than said pivots. The levers J are provided with fixed engaging faces $j^6$, arranged opposite to the corresponding faces of the members $j^3$. The engaging members $j^3$ are loosely connected to the outer ends of the levers J at points at the outside of their pivots $j^4$ for permitting slight upward and downward movement of the members $j^3$ before the levers J are elevated and depressed. Consequently before the levers J are elevated into their operative position the engaging members $j^3$ are slightly raised and the engaging faces $j^5$ $j^6$ are somewhat separated, and before the levers J are depressed for feeding the wire-solder the members $j^3$ are slightly lowered for approximating the faces $j^5$ $j^6$, which firmly engage the wire-solder. As soon as the wire-solder is firmly gripped by the faces $j^5$ $j^6$ the additional downward movement of the engaging members $j^3$ effects the downward movement of the levers J. A solder-feed of the described construction is particularly effective, as the movement of the solder-feed necessary for feeding the solder can take place only when the solder is firmly engaged by said feed.

The outer ends of the feeding-levers J are usually movable in guides $j^7$, provided upon the brackets $A^9$, and springs $j^8$ are secured to said brackets for engaging and tensioning the levers J in order that said levers may move downwardly only when engaged by the cam J² and that undue movement thereof may be prevented.

The stops K for preventing return movement of the wire-solder preferably consist of arms pivoted at $k$ to the corresponding brackets A⁹ and provided with teeth $k'$, arranged beneath the pivots $k$ and nearer the wire-solder than said pivots. The teeth $k'$ are therefore free to move downwardly as the solder is fed onwardly by the feeding-levers J; but return movement of the solder is absolutely prevented by said stops.

The movement of the support J³ for the movable cam J' is effected by a suitable operating member L, which controls the operation of the solder-feeds and is movable into engagement with the cans or other articles conveyed by the supplemental feed B. This operating member preferably consists of a lever arranged at one side of the feed B and having one extremity pivoted at $l$. The opposite extremity of the operating member L is provided with a laterally-extending arm $l'$, adjustably connected by a clamp $l^2$ to the lower end of the support J³, which is pivoted at J⁵ to a standard A¹⁰. The lower end of the support J³ is guided between shoulders J⁶ and its upper end is adjustably secured by a clamp J⁷ to the cam J'. The operating member L and the cam J' are so arranged that a can or other article upon the supplemental feed B forces said operating member outwardly, as clearly seen at Fig. 1, and thereby rocks the support J³, so that the cam J' is in the path of the outer ends of the engaging members $j^3$, carried by the feeding-levers for feeding the solder to the soldering-tool, beneath which the can engaged with said operating-piece is fed by the feed B as the same continues its movement.

The operating member L is forced normally into the path of the cans conveyed by the supplemental feed B by a suitable spring L' or other suitable means, and when the designed position for one of the cans upon the feed B is unoccupied the operating member L is not forced to its operative position, and the cam J' is therefore not rocked into position to engage the member J³, carried by the corresponding feeding-lever, and consequently no solder is fed to the adjacent soldering-tool as it descends, and undue waste of the solder is prevented.

The described construction of the solder-feeds and the operating member for controlling the action of said feeds is particularly suitable for use with this invention; but it is obvious that the exact construction thereof is not a material feature of this invention.

It is sometimes desirable to permit the operation of the soldering-machine without permitting regulation of the solder-feeds by the operating member, and consequently this soldering-machine is provided with a stop for preventing the movement of said operating member. This stop preferably consists of a rocking shaft $m$, provided at one end with a handpiece $m'$ and at its other end with a hook-shaped arm $m^2$, engaged with a loop J⁸, secured to the support J³. As the rocking shaft $m$ is moved in the direction indicated by arrow 1 at Fig. 7, the lower end of the support J³ is drawn outwardly, and consequently the cam J' is forced to its operative position for forcing the solder-feeding levers J to their operative position, and the operating member L is withdrawn out of the path of the cans conveyed by the supplemental feed B. As the shaft $m$ is rocked in the reverse direction, the support J³ is permitted to assume its normal position and the arm $m^2$ is of such construction or curvature that when arranged midway between either of the preceding positions it permits of the necessary movement of the support J³ when actuated by the operating member.

In the operation of this invention, providing the operating member is free to work, the filled and unsoldered cans or other articles to be soldered are fed by one of the supplemental feeds to the main feed, and as each can passes the operating member the cam for forcing the corresponding solder-feeding lever to its operative position is arranged so as to engage said lever. The cans are then fed beneath the soldering-tools, which are continuously but slowly operated, and the solder is uniformly fed at comparatively slow speed to each soldering-tool. The cans are then soldered and delivered with considerable rapidity to the supplemental feed for withdrawing the same from the main feed. If the designed position of one of the filled and unsoldered cans upon the supplemental feed is unoccupied, the operating member is not actuated and the cam for actuating the corresponding solder-feed is not moved into operative position and the solder is not fed to the soldering-tool, thus obviating all waste thereof.

The operation of this soldering-machine will be readily understood upon reference to the foregoing description and the accompanying drawings, and it will be obvious to one skilled in the art that the solder is fed practically and effectively without undue waste in such a manner as to enable rapid delivery of the soldered articles. It is evident, however, that the detail construction and arrangement of said machine, as clearly indicated in the specification, may be somewhat varied without departing from the spirit of this invention, and hence the claims are not limited to such exact detail construction and arrangement.

No claim is made in this application to the combination of an inclosing heating-chamber and a series of connected soldering-tools successively movable within the heating-chamber.

Having thus fully described my invention, what I claim as new, and desire to secure by Letters Patent, is—

1. In a soldering-machine, the combination of a movable feed for the article to be soldered, a solder-feed supported by the former feed and movable simultaneously therewith, and an operating member for making contact with said article and controlling the operation of the solder-feed, substantially as and for the purpose specified.

2. In a soldering-machine, the combination of a revoluble feed for the article to be soldered, a solder-feed supported by the former feed and revoluble therewith, and a movable operating member for making contact with said article and controlling the operation of the solder-feed, substantially as and for the purpose set forth.

3. In a soldering-machine, the combination of a movable feed for the article to be soldered, a solder-feed movable simultaneously with the article to be soldered, means for actuating the solder-feed during the movement of said article, and an operating member for making contact with the article and controlling the operation of said actuating means, substantially as set forth.

4. In a soldering-machine, the combination of a revoluble feed for the articles to be soldered, soldering-tools for said articles, solder-feeds supported by the former feed and revoluble therewith, means for simultaneously actuating a series of the solder-feeds during the movement of said articles, and an operating member for making contact with said articles and controlling the operation of the actuating means, substantially as specified.

5. In a soldering-machine, the combination of a movable feed for the articles to be soldered, an axially-revoluble soldering-tool, a revoluble support for the soldering-tool, a solder-feed revoluble on the same axis as said support and movable simultaneously with the articles to be soldered, and means for actuating the solder-feed during the axial revolution of the soldering-tool, substantially as set forth.

6. In a soldering-machine, the combination of a revoluble feed for the articles to be soldered, axially-revoluble soldering-tools for said articles, solder-feeds supported by the former feed and revoluble therewith, means for simultaneously actuating a series of the solder-feeds during the axial revolutions of the corresponding soldering-tools, and an operating member for making contact with said articles and controlling the operation of the actuating means, substantially as described.

7. In a soldering-machine, the combination of a movable feed for the article to be soldered, a heating-chamber, a soldering-tool arranged normally in the heating-chamber and movable endwise therein and having a portion thereof movable beyond said chamber for engaging the article to be soldered, and a solder-feed for feeding solder to said portion of the soldering-tool, substantially as and for the purpose set forth.

8. In a soldering-machine, the combination of a movable feed for the article to be soldered, a heating-chamber, a soldering-tool arranged normally in the heating-chamber and having a portion thereof movable beyond said chamber for engaging the article to be soldered, a solder-feed movable simultaneously with the article to be soldered for feeding solder to said portion of the soldering-tool, and means for actuating the solder-feed, substantially as and for the purpose described.

9. In a soldering-machine, the combination of a movable feed for the article to be soldered, a solder-feed supported by the former feed and movable simultaneously therewith, an operating member for making contact with said article and controlling the operation of the solder-feed, and a stop for preventing the operation of said operating member, substantially as and for the purpose specified.

10. In a soldering-machine, the combination of a movable feed for the article to be soldered, a wire-solder feed provided with means for engaging the wire-solder and movable simultaneously with the former feed for feeding the wire-solder during the movement of said article by the former feed, and an operating member for making contact with the article to be soldered and controlling the operation of the solder-feed, substantially as and for the purpose described.

11. In a soldering-machine, the combination of a movable feed for the articles to be soldered, an operating member for making contact with the articles to be soldered and controlling the feed of the solder to said articles, and a plurality of solder-feeds controlled by the operating member and successively movable toward and away from said operating member, substantially as and for the purpose specified.

12. In a soldering-machine, the combination of a movable feed for the articles to be soldered, an operating member for making contact with the articles to be soldered and controlling the feed of the solder to said articles, movable means actuated by the operating member, and a plurality of solder-feeds provided with engaging members successively movable into and out of engagement with the movable means, substantially as and for the purpose set forth.

13. In a soldering-machine, the combination of a movable feed for the articles to be soldered, an axially-revoluble soldering-tool, a solder-feed supported by the former feed and movable simultaneously therewith, and means for actuating the solder-feed during the axial revolution of the soldering-tool, substantially as and for the purpose described.

14. In a soldering-machine, the combination of a movable feed for the article to be soldered, a soldering-tool for said article, a wire-solder feed provided with means for engaging the wire-solder and movable simultaneously with the former feed for feeding the wire-solder during the movement of said article by the former feed, a heating-chamber for the soldering-tool, and an operating member for making contact with said article and controlling the operation of the solder-feed, substantially as and for the purpose specified.

15. In a soldering-machine, the combination of a heating-chamber, a heating device or burner discharging within the chamber, a soldering-tool movable in the heating-chamber toward and away from said heating device or burner, a solder-feed for feeding solder to the soldering-tool, and an operating member for making contact with said article and controlling the operation of the solder-feed, substantially as and for the purpose set forth.

16. In a soldering-machine, the combination with a revoluble feed for the article to be soldered; of a soldering-tool, and a wire-solder feed rotating simultaneously with the movable feed on substantially the same axis as the former feed; means for actuating the solder-feed, and an operating member for making contact with the articles to be soldered and controlling the operation of said means for actuating the solder-feed, substantially as and for the purpose described.

17. In a soldering-machine, the combination of a revoluble feed for the article to be soldered, a soldering-tool, a solder-feed supported by the former feed and revoluble therewith, a movable operating member for making contact with said article and controlling the operation of the soldering-feed, and supplemental feeds for conducting said articles toward and away from the revoluble feed, substantially as and for the purpose set forth.

18. In a soldering-machine, the combination of a revoluble feed for the articles to be soldered, soldering-tools for said articles, solder-reels supported by the feed and revoluble therewith, solder-feeds for feeding the solder from said reels, said feeds being supported by the former feed and revoluble therewith, means for actuating the solder-feeds, and an operating member for making contact with said articles and controlling the operation of said actuating means, substantially as described.

19. In a soldering-machine, the combination of a movable feed for the article to be soldered, a heating-chamber consisting of a fixed section and a revoluble section, a soldering-tool movable with the revoluble section of the heating-chamber and having a portion thereof arranged normally within the heating-chamber and movable beneath the same for engaging the article to be soldered, and a solder-feed for feeding solder to the soldering-tool, substantially as and for the purpose set forth.

20. In a soldering-machine, the combination of a movable feed for the article to be soldered, a wire-solder feed consisting of a lever supported by the first feed and movable therewith, an engaging member secured to the lever, and means for actuating the solder-feed during the movement of said article by the first feed, substantially as and for the purpose described.

21. In a soldering-machine, the combination of a movable solder-feeding lever, a movable engaging member connected to the lever, said member being movable independently of the lever into engagement with the solder and being movable simultaneously with the lever after the engagement of the solder for actuating said lever to feed the solder, and means for operating said member, substantially as and for the purpose specified.

22. In a soldering-machine, the combination of a movable solder-feeding lever, a movable engaging member pivoted to the lever and having one extremity movable independently of the lever into engagement with the solder and movable simultaneously with the lever after the engagement of the solder for actuating said lever to feed the solder, and means for engaging the opposite extremity of said member and operating said member, substantially as and for the purpose set forth.

23. In a soldering-machine, the combination of a movable feed for the article to be soldered, a wire-solder feed supported by the first feed and movable therewith, and means for actuating the wire-solder feed during the movement of said article by the first feed, substantially as and for the purpose described.

24. In a soldering-machine, the combination of a revoluble feed for the article to be soldered, and a wire-solder feed revoluble on substantially the same axis as the former feed, substantially as and for the purpose specified.

25. In a soldering-machine, the combination of a movable feed for the article to be soldered, a feeding-lever for the solder, actuating means for rocking said lever and effecting its operation, and a spring for tensioning the feeding-lever and preventing undue movement thereof, substantially as set forth.

26. In a soldering-machine, the combination of a movable feed for the article to be soldered, a feeding-lever provided with means for detachably engaging the solder, actuating means for rocking said lever and effecting its operation during the movement of said article, and an operating member for making contact with said article and controlling the operation of said feeding-lever, substantially as described.

27. In a soldering-machine, the combination of a movable feed for the article to be soldered, a feeding-lever for the solder, a pivoted engaging member for said lever having its engaging face arranged beneath its pivot, and nearer the solder than said pivot, and actuating means for rocking said lever and effecting its operation, substantially as specified.

28. In a soldering-machine, the combination of a movable feed for the article to be soldered, a feeding-lever for the solder, a pivoted engaging member for said lever having its engaging face arranged beneath its pivot and nearer the solder than said pivot, actuating means for rocking said lever and effecting its operation, and an operating member for making contact with said article and controlling the operation of said actuating means, substantially as described.

29. In a soldering-machine, the combination of a revoluble feed for the article to be soldered, a revoluble feeding-lever for the solder, a cam for rocking the feeding-lever into operative position, a second cam for reversely rocking said lever and actuating the same to feed the solder, an operating member for making contact with said article and preventing the operation of the former cam, and a stop for preventing the operation of the operating member, substantially as specified.

30. In a soldering-machine, the combination of a revoluble feed for the article to be soldered, a revoluble feeding-lever for the solder, a cam for rocking the feeding-lever into operative position, and a second cam for reversely rocking said lever and actuating the same to feed the solder, substantially as and for the purpose set forth.

31. In a soldering-machine, the combination of a feed for the articles to be soldered, and a flux-feeding device comprising a rotary carrier and a plurality of feeding members revoluble with the carrier and movable into and out of engagement with said articles, substantially as and for the purpose described.

32. In a soldering-machine, the combination of a feed for the articles to be soldered, and a revoluble flux-feeding device having a plurality of feeding members movable into and out of alinement with said articles, substantially as and for the purpose specified.

33. In a soldering-machine, the combination of a feed for the articles to be soldered, and a flux-feeding device having a plurality of feeding members, said members being revoluble into and out of alinement with said articles and being also movable in a substantially vertical plane toward and away from said articles, substantially as and for the purpose described.

34. In a soldering-machine, the combination of a feed having devices arranged one in advance of the other for engaging and feeding the articles to be soldered, and a revoluble flux-feeding device having a plurality of feeding members movable above the feed into and out of alinement with the articles engaged by said devices of the feed, and driving mechanism connecting said feed and flux-feeding device, substantially as and for the purpose described.

35. In a soldering-machine, the combination of a feed for the articles to be soldered, and a flux-feeding device comprising a receptacle for the flux, a feeding member for the flux, a second feeding member movable into and out of engagement with the former feeding member and into and out of alinement with the articles to be soldered, and means for actuating said second feeding member, substantially as and for the purpose specified.

36. In a soldering-machine, the combination of a feed for the articles to be soldered; with a flux-feeding device comprising a receptable for the flux, a feeding member consisting of a roller movable in the flux, and a plurality of revoluble feeding members for engaging the former feeding member and the articles to be soldered, substantially as and for the purpose set forth.

37. In a soldering-machine, the combination of a feed for the articles to be soldered; with a flux-feeding device provided with a revoluble feeding member having its outer end movable vertically and provided with a brush for engaging the articles to be soldered, substantially as and for the purpose described.

38. In a soldering-machine, the combination of a feed for the articles to be soldered, and a flux-feeding device provided with a track having a depressed portion and a feeding member movable along the track and having its engaging face movable vertically toward and away from the articles to be soldered, substantially as and for the purpose specified.

39. The combination of a feed for the articles to be soldered and a rotary flux-feeding device provided with an annular row of brushes, the several brushes being movable successively into engagement with said articles, substantially as and for the purpose set forth.

40. The combination with the can-conveyer and a rotary carrier arranged above the same, of brushes mounted in said carrier and capable of vertical movement independent of each other while rotating with said carrier, and a guide-ring provided with a depression above said conveyer, whereby the brushes are successively lowered and raised as they pass over the conveyer and the cans carried thereby, substantially as set forth.

41. In a soldering-machine, the combination of a movable feed for the articles to be soldered, a revoluble feed for supplying material to said articles, and an operating member for making contact with the articles to be soldered and controlling the operation of said revoluble feed, substantially as and for the purpose specified.

42. In a soldering-machine, the combination of a movable feed for the article to be soldered, a wire-solder feed provided with means for engaging the wire-solder and movable simultaneously with the first feed for feeding the wire-solder during the movement of said article by the first feed, an operating member for making contact with the article to be soldered and controlling the operation of the solder-feed, and a stop for preventing the operation of said operating member, substantially as and for the purpose specified.

In testimony whereof I have hereunto signed my name, in the presence of two attesting witnesses, at Syracuse, in the county of Onondaga, in the State of New York, this 21st day of February, 1895.

GAIUS LEWIS MERRELL.

Witnesses:
 E. A. WEISBURG,
 K. H. THEOBALD.